(12) United States Patent
Miller et al.

(10) Patent No.: US 11,994,066 B2
(45) Date of Patent: May 28, 2024

(54) THERMAL MANAGEMENT SYSTEM

(71) Applicant: General Electric Company, Schenectady, NY (US)

(72) Inventors: Brandon Wayne Miller, Liberty Township, OH (US); Kevin Edward Hinderliter, Cincinnati, OH (US); Daniel Alan Niergarth, Norwood, OH (US); Brian Gene Brzek, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/874,358

(22) Filed: Jul. 27, 2022

(65) Prior Publication Data

US 2024/0035416 A1 Feb. 1, 2024

(51) Int. Cl.
*F02C 7/12* (2006.01)
*F02C 7/06* (2006.01)

(52) U.S. Cl.
CPC ............... *F02C 7/12* (2013.01); *F02C 7/06* (2013.01); *F05D 2240/50* (2013.01); *F05D 2260/20* (2013.01)

(58) Field of Classification Search
CPC .......... F02C 7/12; F02C 7/06; F05D 2240/50; F05D 2260/20
See application file for complete search history.

(56) References Cited

U.S. PATENT DOCUMENTS

| | | | |
|---|---|---|---|
| 10,260,419 B2* | 4/2019 | Cerny | F02C 7/224 |
| 10,941,706 B2* | 3/2021 | Sen | F02C 3/04 |
| 2017/0114721 A1* | 4/2017 | Miller | F02C 7/185 |
| 2017/0167382 A1* | 6/2017 | Miller | B64D 15/06 |
| 2018/0050811 A1* | 2/2018 | Niergarth | B64D 27/02 |
| 2022/0298967 A1* | 9/2022 | Balandier | F02C 6/18 |

* cited by examiner

*Primary Examiner* — Jesse S Bogue
(74) *Attorney, Agent, or Firm* — Dority & Manning, P.A.

(57) ABSTRACT

A thermal management system of a gas turbine engine, the thermal management system including: a thermal transport bus configured to have a heat exchange fluid flowing therethrough and including a pump including a plurality of bearings; an auxiliary thermal bus in thermal communication with the plurality of bearings; and an auxiliary heat exchanger in thermal communication with the auxiliary thermal bus.

19 Claims, 5 Drawing Sheets

THERMAL MANAGEMENT SYSTEM

FIELD

The present disclosure relates to a thermal management system for a gas turbine engine and a method for operating the same

BACKGROUND

Gas turbine engines typically include an inlet, a fan, one or more compressors, a combustor, and at least one turbine. The compressors compress air which is channeled to the combustor where it is mixed with fuel. The mixture is then ignited for generating hot combustion gases. The combustion gases are channeled to the turbine(s), which extracts energy from the combustion gases for powering the compressor(s), as well as for producing useful work to propel an aircraft in flight or to power a load, such as an electrical generator.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
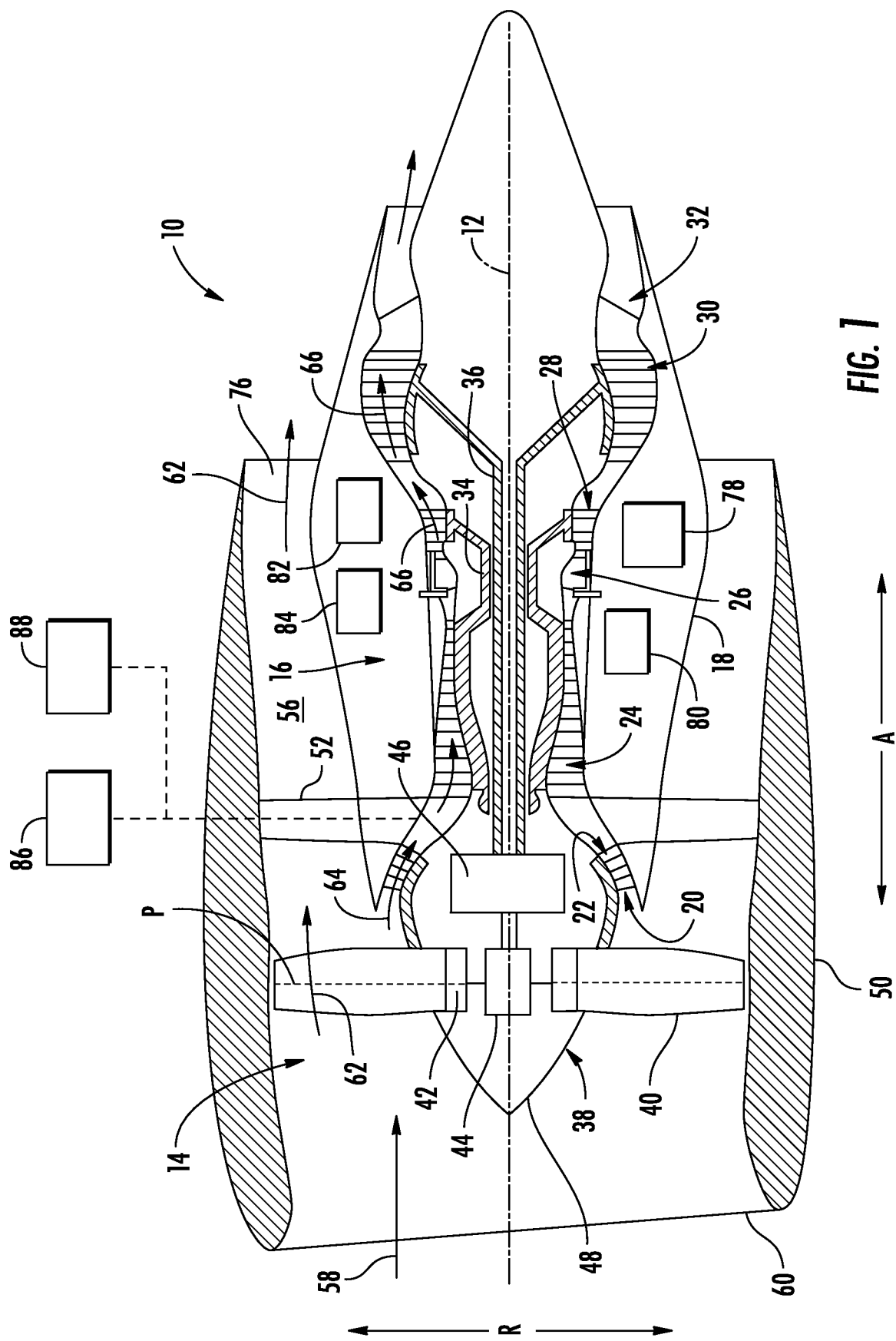
FIG. 1 is a cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "first" and "second" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

For purposes of the description hereinafter, the terms "lower", "bottom", "longitudinal", and derivatives thereof shall relate to the embodiments as they are oriented in the drawing figures. However, it is to be understood that the embodiments may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting The term "at least one of" in the context of, e.g., "at least one of A, B, and C" refers to only A, only B, only C, or any combination of A, B, and C.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

Generally, during operation of the gas turbine engine, various systems may generate a relatively large amount of heat. Thermal management systems of the gas turbine engine may collect heat from one or more of these systems to maintain a temperature of such systems within an acceptable operating range. The thermal management systems may remove or expel such heat through one or more heat exchangers.

Aspects of the present disclosure present a thermal management system including a secondary cooling line, such as the auxiliary thermal bus described below, in thermal communication with a plurality of bearings of a pump of the thermal management system. The auxiliary thermal bus may share the same heat exchange fluid as the thermal transport bus, such as through a valve upstream of the pump configured to allow for desired fluid communication therethrough.

The temperature of the heat exchange fluid flowing through the auxiliary thermal bus allows for desired cooling, thermal attenuation, or heat transfer for the pump despite a relatively high temperature of a heat exchange fluid through the thermal transport bus.

Further, aspects of the present disclosure present a method of operating a thermal management system of a gas turbine engine. A flow of a heat exchange fluid is generated within an auxiliary thermal bus by a pump of the thermal management system. The pump is in fluid communication with the auxiliary thermal bus and includes a plurality of bearings. The heat exchange fluid in the auxiliary thermal bus is cooled with an auxiliary heat exchanger and subsequently provided to the plurality of bearings. In this way, the thermal transport bus can operate over a much wider range of pump inlet temperatures as the thermal transport bus capabilities may generally be set by the capabilities of the plurality of bearings of the pump.

Benefits of the disclosed thermal management system and method of operating include improved size and power density of the thermal management system and improved reliability and capability of the pump.

Referring now to the drawings, wherein identical numerals indicate the same elements throughout the figures, FIG. 1 is a schematic, cross-sectional view of a gas turbine engine in accordance with an exemplary embodiment of the present disclosure. More particularly, for the embodiment of FIG. 1, the gas turbine engine is a high-bypass turbofan jet engine, referred to herein as "turbofan engine 10." As shown in FIG. 1, the turbofan engine 10 defines an axial direction A (extending parallel to a longitudinal centerline 12 provided for reference) and a radial direction R. In general, the turbofan engine 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal centerline 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by nacelle 48 aerodynamically contoured to promote an airflow through the plurality of fan blades 40. Additionally, the exemplary fan section 14 includes an annular fan casing or outer nacelle 50 that circumferentially surrounds the fan 38 or at least a portion of the turbomachine 16. The nacelle 48 is supported relative to the turbomachine 16 by a plurality of circumferentially-spaced outlet guide vanes 52. Moreover, the nacelle 48 extends over an outer portion of the turbomachine 16 so as to define a bypass airflow passage 56 therebetween.

During operation of the turbofan engine 10, a volume of air 58 enters the turbofan engine 10 through an associated inlet 60 of the nacelle 48 or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66. Subsequently, the combustion gases 66 are routed through the HP turbine 28 and the LP turbine 30, where a portion of thermal or kinetic energy from the combustion gases 66 is extracted.

The combustion gases 66 are then routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan engine 10, also providing propulsive thrust.

Moreover, as is depicted schematically, the exemplary turbofan engine 10 further includes various accessory systems to aid in the operation of the turbofan engine 10 or an aircraft including the turbofan engine 10. For example, the exemplary turbofan engine 10 further includes a main lubrication system 78 configured to provide a lubricant to, e.g., various bearings and gear meshes in the compressor section (including the LP compressor 22 and HP compressor 24), the turbine section (including the HP turbine 28 and the LP turbine 30), the HP spool 34, the LP spool 36, and the power gear box 46. The lubricant provided by the main lubrication system 78 may increase the useful life of such components and may remove a certain amount of heat from such components. Additionally, the turbofan engine 10 includes a compressor cooling air (CCA) system 80 for providing air from one or both of the HP compressor 24 or LP compressor 22 to one or both of the HP turbine 28 or LP turbine 30. Moreover, the exemplary turbofan engine 10 includes an active thermal clearance control (ACC) system 82 for cooling a casing of the turbine section to maintain a clearance between the various turbine rotor blades and the turbine casing within a desired range throughout various engine operating conditions. Furthermore, the exemplary turbofan engine 10 includes a generator lubrication system 84 for providing lubrication to an electronic generator, as well as cooling/heat removal for the electronic generator. The electronic generator may provide electrical power to, e.g., a startup electric motor for the turbofan engine 10 or various other electronic components of the turbofan engine 10 or an aircraft including the turbofan engine 10.

As is also depicted schematically, the exemplary turbofan engine 10 drives or enables various other accessory systems, e.g., for an aircraft including the exemplary turbofan engine 10. For example, the exemplary turbofan engine 10 provides compressed air from the compressor section to an environmental control system (ECS) 86. The ECS 86 may provide an air supply to a cabin of the aircraft for pressurization and thermal control. Additionally, air may be provided from the exemplary turbofan engine 10 to an electronics cooling system 88 for maintaining a temperature of certain electronic components of the turbofan engine 10 or aircraft within a desired range.

Conventional turbofan engines 10 or aircrafts included individual heat exchangers for each of these accessory systems to remove heat from air or lubrication in such systems. However, aspects of the present disclosure include a thermal management system 100 (see FIG. 2) for transferring heat from some or all of such accessory systems to more efficiently remove such heat or utilize such heat.

It should be appreciated, however, that the exemplary turbofan engine 10 depicted in FIG. 1 is by way of example only, and that in other exemplary embodiments, aspects of the present disclosure may additionally, or alternatively, be applied to any other suitable gas turbine engine. For example, in other exemplary embodiments, the turbofan engine 10 may instead be any other suitable aeronautical gas turbine engine, such as a turbojet engine, turboshaft engine, turboprop engine, etc. Additionally, in still other exemplary embodiments, the exemplary turbofan engine 10 may include or be operably connected to any other suitable accessory systems. Additionally, or alternatively, the exemplary turbofan engine 10 may not include or be operably connected to one or more of the accessory systems discussed above.

Figure 2:
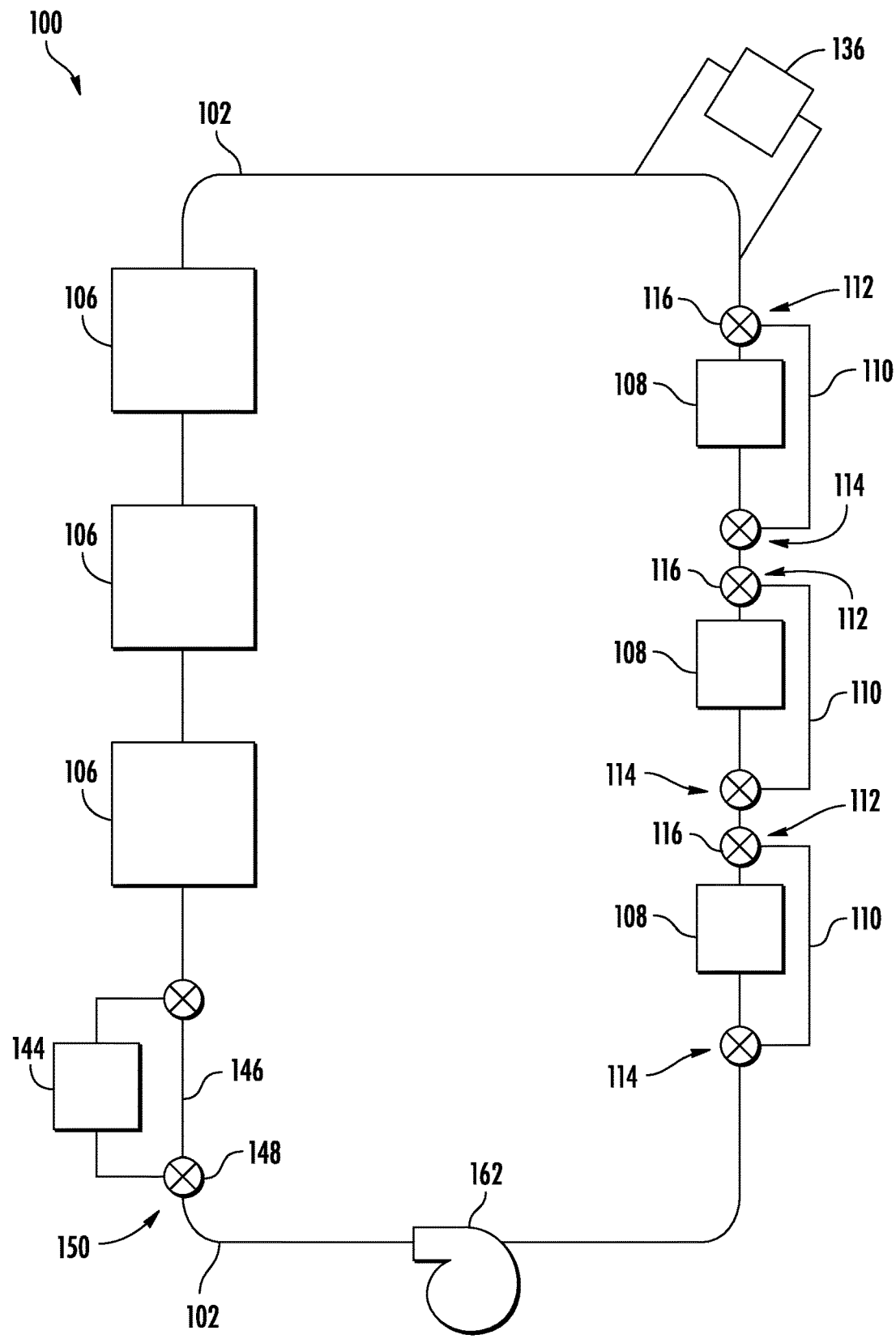
FIG. 2 is a simplified schematic view of a thermal management system in accordance with an exemplary embodiment of the present disclosure.

Referring now to FIG. 2, a schematic, flow diagram is provided of a thermal management system 100 in accordance with an exemplary embodiment of the present disclosure for incorporation at least partially into the exemplary turbofan engine 10 of FIG. 1.

As shown, the thermal management system 100 generally includes a thermal transport bus 102. The thermal transport bus 102 includes a heat exchange fluid (not depicted) flowing therethrough and may be formed of one or more suitable fluid conduits. The heat exchange fluid may be a supercritical fluid having a temperature and pressure above its critical point. A pump 162 is provided in flow communication with the heat exchange fluid in the thermal transport bus 102. The pump 162 is provided in flow communication with the heat exchange fluid in the thermal transport bus 102 for generating a flow of the heat exchange fluid in or through the thermal transport bus 102. As viewed in FIG. 2, the pump 162 may generate a flow of the heat exchange fluid generally in a clockwise direction through the thermal transport bus 102. The pump 162 may be a rotary pump including an impeller, or alternatively may be any other suitable fluid pump. Additionally, the pump 162 may be powered by an electric motor, or alternatively may be in mechanical communication with and powered by, e.g., the HP shaft 34 or the LP shaft 36 of the turbofan engine 10. In still other embodiments, the pump 162 may be powered by an auxiliary turbine, which in turn may be powered by bleed air from compressor section of a gas turbine engine within which the thermal management system 100 is incorporated.

Moreover, the exemplary thermal management system 100 includes one or more heat source exchangers 106 in thermal communication with the heat exchange fluid in the thermal transport bus 102. Specifically, the thermal management system 100 depicted includes a plurality of heat source exchangers 106. The plurality of heat source exchangers 106 are configured to transfer heat from one or more of the accessory systems of the turbofan engine 10 (or in operable communication with the turbofan engine 10) to the heat exchange fluid in the thermal transport bus 102. For example, in certain exemplary embodiments, the plurality of heat source exchangers 106 may include one or more of: a main lubrication system 78 heat exchanger for transferring heat from the main lubrication system 78; a CCA system heat source exchanger for transferring heat from the CCA system 80; an ACC system heat source exchanger for transferring heat from the ACC system 82; a generator lubrication system heat source exchanger for transferring heat from the generator lubrication system 84; an ECS heat exchanger for transferring heat from the ECS 86; an electronics cooling system heat exchanger for transferring heat from the electronics cooling system 88; a vapor compression system heat exchanger; an air cycle system heat exchanger; and an auxiliary system(s) heat source exchanger. By way of example, the auxiliary system(s) heat source exchanger may be configured to transfer heat from one or more of a radar system, a defense system, passenger entertainment systems, etc. Accordingly, a thermal management system 100 in accordance with an exemplary embodiment of FIG. 2 may transfer heat from a variety of independent systems to the heat exchange fluid in the thermal transport bus 102 for removal.

For the embodiment depicted, there are three heat source exchangers 106, the three heat source exchangers 106 each arranged in series flow along the thermal transport bus 102. However, in other exemplary embodiments, any other suitable number of heat source exchangers 106 may be included and one or more of the heat source exchangers 106 may be arranged in parallel flow along the thermal transport bus 102. For example, in other embodiments, there may be a single heat source exchanger 106 in thermal communication with the heat exchange fluid in the thermal transport bus 102, or alternatively, there may be at least two heat source exchangers 106, least four heat source exchangers 106, at least five heat source exchangers 106, or at least six heat source exchangers 106 in thermal communication with heat exchange fluid in the thermal transport bus 102.

Additionally, the exemplary thermal management system 100 of FIG. 2 further includes one or more heat sink exchanger 108 permanently or selectively in thermal communication with the heat exchange fluid in the thermal transport bus 102. The one or more heat sink exchangers 108 are located downstream of the plurality of heat source exchangers 106 and are configured for transferring heat from the heat exchange fluid in the thermal transport bus 102, e.g., to atmosphere, to fuel, to a fan stream, etc. For example, in certain embodiments the one or more heat sink exchangers 108 may include at least one of a RAM heat exchanger, a fuel heat exchanger, a fan stream heat exchanger, a bleed air heat exchanger, an engine intercooler, or a cold air output of am air cycle system. The RAM heat exchanger may be configured as an "air to heat exchange fluid" heat exchanger integrated into one or both of the turbofan engine 10 or an aircraft including the turbofan engine 10. During operation, the RAM heat exchanger may remove heat from any heat exchange fluid therein by flowing a certain amount of RAM air over the RAM heat exchanger. Additionally, the fuel heat exchanger is a "fluid to heat exchange fluid" heat exchanger wherein heat from the heat exchange fluid is transferred to a stream of liquid fuel for the turbofan engine 10. Moreover, the fan stream heat exchanger is generally an "air to heat exchange fluid" heat exchanger which flows, e.g., bypass air over heat exchange fluid to remove heat from the heat exchange fluid. Further, the bleed air heat exchanger is generally an "air to heat exchange fluid" heat exchanger which flows, e.g., bleed air from the LP compressor 22 over heat exchange fluid to remove heat from the heat exchange fluid.

For the embodiment of FIG. 2, the one or more heat sink exchangers 108 of the thermal management system 100 depicted includes a plurality of individual heat sink exchangers 108. More particularly, for the embodiment of FIG. 2, the one or more heat sink exchangers 108 include three heat sink exchangers 108 arranged in series. The three heat sink exchangers 108 are configured as a RAM heat exchanger, a fuel heat exchanger, and a fan stream heat exchanger. However, in other exemplary embodiments, the one or more heat sink exchangers 108 may include any other suitable number of heat sink exchangers 108. For example, in other exemplary embodiments, a single heat sink exchanger 108 may be provided, at least two heat sink exchangers 108 may be provided, at least four heat sink exchangers 108 may be provided, or at least five heat sink exchangers 108 may be provided. Additionally, in still other exemplary embodiments, two or more of the one or more heat sink exchangers 108 may alternatively be arranged in parallel flow with one another.

Referring still to the exemplary embodiment depicted in FIG. 2, the plurality of heat sink exchangers 108 are selectively in thermal communication with the heat exchange fluid in the thermal transport bus 102. More particularly, the thermal management system 100 depicted includes a plurality of bypass lines 110 for selectively bypassing each heat sink exchanger 108 in the plurality of heat sink exchangers 108. Each bypass line 110 extends between an upstream juncture 112 and a downstream juncture 114. The upstream juncture 112 is located just upstream of a respective heat sink exchanger 108, and the downstream juncture 114 is located just downstream of the respective heat sink exchanger 108. Additionally, each bypass line 110 meets at the respective upstream juncture 112 with the thermal transport bus 102 via a three-way heat sink valve 116. The three-way heat sink valves 116 each include an inlet fluidly connected with the thermal transport bus 102, a first outlet fluidly connected with the thermal transport bus 102, and a second outlet fluidly connected with the bypass line 110. The three-way heat sink valves 116 may each be a variable throughput three-way valve, such that the three-way heat sink valves 116 may vary a throughput from the inlet to the first or second outlets. For example, the three-way heat sink valves 116 may be configured for providing any amount between zero percent (0%) and one hundred percent (100%) of the heat exchange fluid from the inlet to the first outlet, and similarly, the three-way heat sink valves 116 may be configured for providing anywhere between zero percent (0%) and one hundred percent (100%) of the heat exchange fluid from the inlet to the second outlet.

Notably, the three-way heat sink valves 116 may be in operable communication with a controller of the turbofan engine 10 or of an aircraft including the turbofan engine 10. The controller may bypass one or more of the one or more heat sink exchangers 108 based on, e.g., an operating condition of the turbofan engine 10 or aircraft, a temperature of the heat exchange fluid, or any other suitable variables. Alternatively, the controller may bypass one or more of the one or more heat sink exchangers 108 based on a user input.

The thermal management system 100 of FIG. 2 may more efficiently remove heat from the various accessory systems of the turbofan engine 10 or the aircraft, compared with conventional systems. For example, the various accessory systems may generate a varying amount of heat dependent on various operating conditions of the turbofan engine 10 or the aircraft. However, not all of the accessory systems define the same heat pattern (e.g., not all of the accessory systems heat up and cool down at the same time). For example, the main lubrication system 78 may require a maximum amount of heat removal during high load conditions of the turbofan engine 10. By contrast, however, the ECS 86 may require a max amount of heat removal during high-altitude flight. Accordingly, by integrating the heat removal for the variety of different accessory systems, fewer heat exchangers may be required to remove a desired amount of heat or smaller heat exchangers may be required to remove a desired amount of heat.

Moreover, due to the configuration of the various heat sink exchangers 108 (or a surface heat exchange module 136, discussed below) being in selective thermal communication with the heat exchange fluid in the thermal transport bus 102, heat may be removed from the various accessory systems in a more efficient manner. For example, when a relatively low amount of heat may be required to be removed from the heat exchange fluid, the most efficient heat sink exchanger 108 (or the surface heat exchange module 136, discussed below) may be utilized and the others bypassed. However, when a relatively high amount of heat may be required to be removed from the heat exchange fluid, the additional heat sink exchangers 108 (or the surface heat exchange module 136, discussed below) may also be utilized.

Furthermore, in the exemplary embodiments including a plurality of heat sink exchangers 108 (or the surface heat exchange module 136, discussed below) having bypass capability, for example, the additional heat sink exchangers 108 (or the surface heat exchange module 136, discussed below) have the benefit of adding redundancy to the thermal management system 100. For example, in the event of a failure of one or more of the heat sink exchangers 108 or associated portions of the thermal transport bus 102, the heat exchange fluid may be routed around such failure and the thermal management system 100 may continue to provide at least some heat removal.

Referring still to FIG. 2, the exemplary thermal management system 100 depicted is configured to use a supercritical heat exchange fluid. It should be appreciated, however, that in other embodiments, the thermal management system 100 instead use a phase change fluid. With such an embodiment, the thermal management system 100 may include a compressor for compressing the heat exchange fluid in the thermal transport bus 102, and an expansion device for expanding the heat exchange fluid in the thermal transport bus 102. The compressor may be selectively in fluid communication with the heat exchange fluid at a location downstream of the heat source exchangers 106 and upstream of the one or more heat sink exchangers 108. By contrast, the expansion device may be selectively in fluid communication with the heat exchange fluid at a location downstream of the one or more heat sink exchangers 108 and upstream of the heat source exchangers 106. In such an exemplary embodiment, the compressor may be driven by, e.g., an electric motor, or alternatively may be in mechanical communication with and driven by a rotary component of the turbofan engine 10, such as the HP shaft 34 or the LP shaft 36. Notably, with such a configuration, the one or more heat sink exchangers 108 (or the surface heat exchange module 136, discussed below) would act as a condenser, and the plurality of heat source exchangers 106 would act as an evaporator. Such a configuration may allow for efficient heat removal from the various heat source exchangers 106, and heat transfer to the one or more heat sink exchangers 108 (or the surface heat exchange module 136). It should also be appreciated, that in certain exemplary embodiments, the expansion device may be utilized as a power generating device configured to generate rotational power from a flow of heat exchange fluid therethrough.

Further, the exemplary thermal management system 100 of FIG. 2 additionally includes a fuel chiller 144 selectively in thermal communication with heat exchange fluid in the thermal transport bus 102 at a location upstream of the plurality of heat source exchangers 106 and downstream of the one or more heat sink exchangers 108. The fuel chiller 144 may be configured to remove heat from the fuel of the turbofan engine 10 to assist with maintaining the fuel within a desired temperature range. As with various other components of the thermal management system 100 of FIG. 2, the thermal management system 100 additionally includes a fuel chiller bypass line 146 for selectively bypassing the fuel chiller 144 and a three-way fuel chiller bypass valve 148. The three-way fuel chiller bypass valve 148 is located at an upstream juncture 150 and fluidly connects the thermal transport bus 102 and fuel chiller bypass line 146. The fuel chiller bypass valve 148 may be a variable throughput three-way valve configured in substantially the same manner as the exemplary three-way heat sink valves 116 described above for bypassing operation of a respective heat sink exchanger 108.

Furthermore, the exemplary thermal management system 100 of FIG. 2 includes features for heating or de-icing certain components of an aircraft or the turbofan engine 10. Specifically, the exemplary thermal management system 100 includes a surface heat exchange module 136 in thermal communication with the heat exchange fluid in the thermal transport bus 102 at a location downstream from the one or more heat source exchangers 106 for transferring heat from the thermal transfer fluid to a surface of one or more components of the turbofan engine 10 or an aircraft. For the embodiment depicted, the surface heat exchange module 136 is also located upstream of the one or more heat sink exchangers 108. However, in other embodiments, the surface heat exchange module 136 may instead be located at any suitable location downstream of the one or more heat source exchangers 106. For example, in other embodiments, the surface heat exchange module 136 may be located upstream of the pump 162, or alternatively may be located downstream of one or more of the heat sink exchangers 108.

It should be appreciated, however, that the thermal management system 100 is provided by way of example only and that in other exemplary embodiments the thermal management system 100 may be configured in any other suitable manner. For example, in other exemplary embodiments, the thermal management system 100 may not include certain other components depicted in FIG. 2, such as the fuel chiller 144. Further, in still other embodiments, the thermal management system 100 may be configured as a dedicated surface heat exchange thermal management system 100. Accordingly, in such a configuration, the thermal management system 100 may not include one or more heat sink exchangers 108 in thermal communication with the heat exchange fluid in the thermal transport bus 102, and instead, the surface heat exchange module 136 may be configured as the primary means for removing heat from the heat exchange fluid in the thermal transport bus 102.

Figure 3:
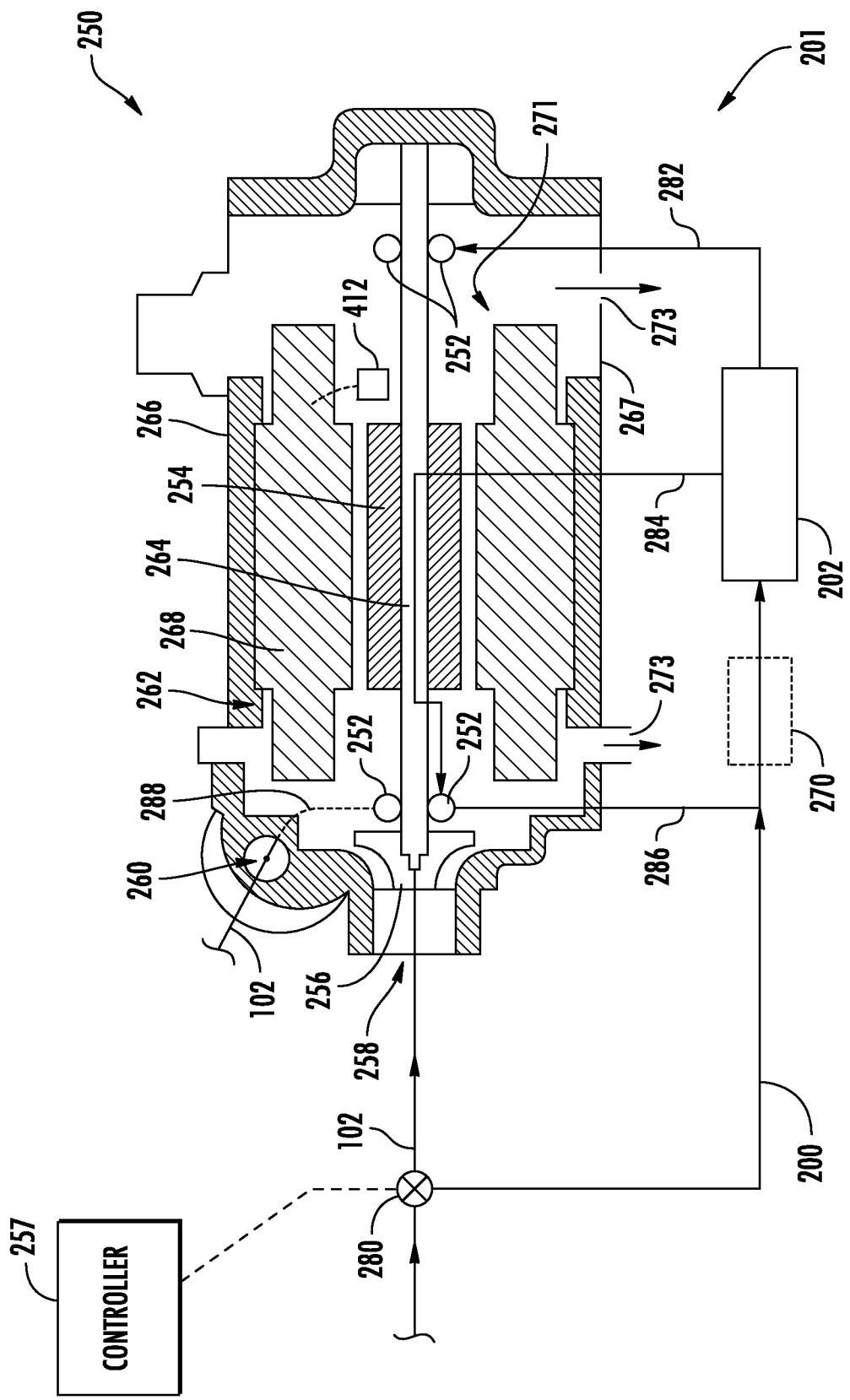
FIG. 3 is a simplified schematic view of a thermal management system in accordance with another exemplary embodiment of the present disclosure.

Referring now to FIG. 3, a simplified schematic view of a thermal management system 201 in accordance with another exemplary embodiment of the present disclosure is provided. The exemplary thermal management system 100 of FIG. 3 may be configured in a similar manner as the exemplary thermal management system 100 of FIG. 2

The exemplary thermal management system 201 includes a thermal transport bus 102, a pump 250, an auxiliary thermal bus 200, and an auxiliary heat exchanger 202. The thermal transport bus 102 has a heat exchange fluid (not depicted) flowing therethrough. The pump 250 is in fluid communication with the thermal transport bus 102 and is configured to generate the flow of the heat exchange fluid in the thermal transport bus 102. As described above, it should be appreciated that the heat exchange fluid may be a supercritical fluid having a temperature and pressure above its critical point The pump 250 may be incorporated into a thermal management system 201 similar to the exemplary thermal management system 100 of FIG. 2 (e.g., as pump 162), or may be incorporated into any other suitable thermal management system.

It should be appreciated that the exemplary pump 250 is configured as a supercritical pump operable to generate a flow of the heat exchange fluid in a supercritical phase. More particularly, the pump 250 may generate a flow of the heat exchange fluid at a pressure suitable for a supercritical fluid. For example, the pump 250 may generate a flow of the heat exchange fluid at a pressure up to 10,000 psi, such as up to 2,000 psi, such as up to 5,000 psi.

More specifically, the pump 250 defines an inlet 258 and an outlet 260 and includes a plurality of bearings 252, an electric machine 262, a shaft 264, an impeller 256, and a housing 266 enclosing these components.

The electric machine 262 generally includes a rotor 254 coupled to the shaft 264 and a stator 268. The stator 268 is, for the embodiment shown, mounted to the housing 266. The electric machine 262 may be configured in any suitable manner for converting electrical power to mechanical power. For example, the electric machine may be configured as an asynchronous or induction electric machine operable to utilize alternating current (AC) electric power. Alternatively, the electric machine may be configured as a synchronous electric machine operable to utilize AC electric power or direct current (DC) electric power. In such a manner it will be appreciated that the stator, the rotor, or both may generally include one or more of a plurality of coils or winding arranged in any suitable number of phases, one or more permanent magnets, one or more electromagnets, etc.

During operation, electric power may be provided to the electric machine 262 through an inlet power line (not shown) to drive the electric machine 262 and rotate the rotor 254, which may in turn, rotate the shaft 264 and the impeller 256 to generate a pressure rise in the flow of heat exchange fluid received by the pump 250 through the inlet 258 and provided to the outlet 260.

The plurality of bearings 252 are configured to support rotation of the shaft 264 relative to the housing 266. Although not depicted, the plurality of bearings 252 may be grounded to the housing 266 through one or more support members. The plurality of bearings 252 may be configured as roller bearings, ball bearings, tapered roller bearings, or any other suitable type of bearing capable of supporting rotation of the shaft 264 within the housing 266.

More particularly, the auxiliary thermal bus 200 is in thermal communication with the plurality of bearings 252 and is configured to provide the heat exchange fluid to the plurality of bearings 252. Additionally, the auxiliary thermal bus 200 in in fluid communication with the rotor 254 and the impeller 256.

Generally, during an operating condition of the thermal management system 201, the plurality of bearings 252 sets the operational temperature of the thermal transport bus 102. The operational temperature of the thermal transport bus 102 may be set at the maximum operational temperature of the plurality of bearings 252. The maximum operational temperature of the plurality of bearings 252 refers to a maximum operational temperature the plurality of bearings 252 may be exposed to without prematurely wearing. It should be appreciated that the plurality of bearings 252 may be any suitable type of bearing (e.g., a roller bearing or a ball bearing) made from any suitable material (e.g., metal or ceramic) having a suitable maximum operational temperature. For example, the plurality of bearings 252 may be a plurality of ball bearings made from steel having a maximum operational temperature of 750 Fahrenheit. More particularly, the thermal management system 201 includes a valve 280 configured to selectively fluidly connect the auxiliary thermal bus 200 or the pump 250 to the thermal transport bus 102. In the exemplary embodiment depicted the auxiliary thermal bus 200 is in fluid communication with the thermal transport bus 102 at a location upstream of the pump 250. Additionally, the auxiliary thermal bus 200 is in fluid communication with the outlet 260 of the pump 250 and is in thermal communication with the auxiliary heat exchanger 202. The auxiliary heat exchanger 202 is configured to remove heat from the heat exchange fluid in the auxiliary thermal bus 200.

During an operating condition of the thermal management system 201 in the exemplary embodiment depicted, the heat exchange fluid flows from the thermal transport bus 102 into the auxiliary thermal bus 200 at the location upstream of the pump 250. The auxiliary heat exchanger 202 then removes heat from the heat exchange fluid. The heat exchange fluid defines a first average temperature when in the thermal transport bus 102. Further, the heat exchange fluid defines a second average temperature when in the auxiliary thermal bus 200 at a location downstream of the auxiliary heat exchanger 202 and upstream of the pump 250, such as upstream of the plurality of bearings 252. The second average temperature is lower than the first average temperature. The auxiliary thermal bus 200 provides the heat exchange fluid that defines the second average temperature to the plurality of bearings 252. More specifically, the auxiliary thermal bus 200 includes a first outlet line 282 and a second outlet line 284 configured to provide the heat exchange fluid to the plurality of bearings 252. The first outlet line 282 extends from the auxiliary heat exchanger 202 to the bearings 252, and the second outlet line 284 extends from the auxiliary heat exchanger 202 through the stator 268 and to the rotor 254 and shaft 264. The heat exchange fluid then flows from the plurality of bearings 252 to the impeller 256, the outlet 260, or both.

It should be appreciated that the auxiliary thermal bus 200 of the exemplary embodiment is configured to be a recirculation loop. In the exemplary embodiment depicted the auxiliary thermal bus 200 accordingly includes a return line 286 configured to recirculate the heat exchange fluid that flows from the plurality of bearings 252 to a location upstream of the auxiliary heat exchanger 202.

Further, the auxiliary thermal bus 200 of the exemplary embodiment depicted is formed integrally with the pump 250.

It should be appreciated that the auxiliary thermal bus 200 of the exemplary embodiment is provided by way of example only. For example, in alternative exemplary embodiments, the auxiliary thermal bus 200 may be coupled to the pump 250.

In the exemplary embodiment depicted, the thermal management system 201 further includes a controller 257 that is operable coupled to the valve 280 and can be configured to implement the methods below. The exemplary controller 257 is configured to receive date sensed from a sensor, such as sensor 412, and make control decision for the thermal management system 201 based on the received data.

Additionally, or alternatively, the pump 250 may include a second auxiliary heat exchanger 270 (shown in phantom). The second auxiliary heat exchanger 270 adds heat to the heat exchange fluid in the auxiliary thermal bus 200. It should be appreciated that the second auxiliary heat exchanger 270 may be used to facilitate start-up of the pump 250. For example, the second auxiliary heat exchanger 270 may add heat to the heat exchange fluid in the auxiliary thermal bus 200. The heat exchange fluid may then be provided to the plurality of bearings 252 of the pump 250 during a startup operating condition. The heat exchange fluid may raise the temperature of the plurality of bearings 252 to the operational temperature of the plurality of bearings 252.

Moreover, the auxiliary thermal bus 200 may not be a recirculation loop. For example, the auxiliary thermal bus 200 may include an open loop heat exchanger fluid return path 288 (depicted in phantom). The open loop heat exchanger fluid return path 288 may be configured to provide the heat exchange fluid to the outlet 260. It should be appreciated that the open loop heat exchanger fluid return path 288 may replace the return line 286 discussed above, or may be in addition to the return line 286.

Additionally, as depicted in FIG. 3, the pump 250 defines a cavity 271 that encloses the plurality of bearings 252. In addition, the pump 250 (and more specifically, the housing 266 of the pump 250) defines a plurality of liquid drains openings 273 in fluid communication with the cavity 271 and positioned on a bottom portion 267 of the housing 266. The bottom portion 267 refers to a lower 40% of the housing 266 in a normal mounting orientation. It should be appreciated that "normal mounting orientation" refers to a mounting orientation of the pump 250 such that the pump is operable during an operation condition. During an operating condition, such as an idle operating condition, the heat exchanger fluid that is provided to the plurality of bearings 252 may cool and change phase from a gaseous phase to a liquid phase. As a result, the heat exchanger fluid in the liquid phase may accumulate around the impeller 256. Accumulation of the heat exchanger fluid in the liquid phase around the impeller 256 may be undesirable during an operating condition, such as a start-up operating condition, as it may create an imbalance on the impeller 256. However, inclusion of the liquid drain openings 273 may allow for the heat exchange fluid in the liquid phase that has accumulated to drain out of the pump 250, and more specifically, out from around the impeller 256, through the cavity 271, and out of the liquid drain openings 273.

Figure 4:
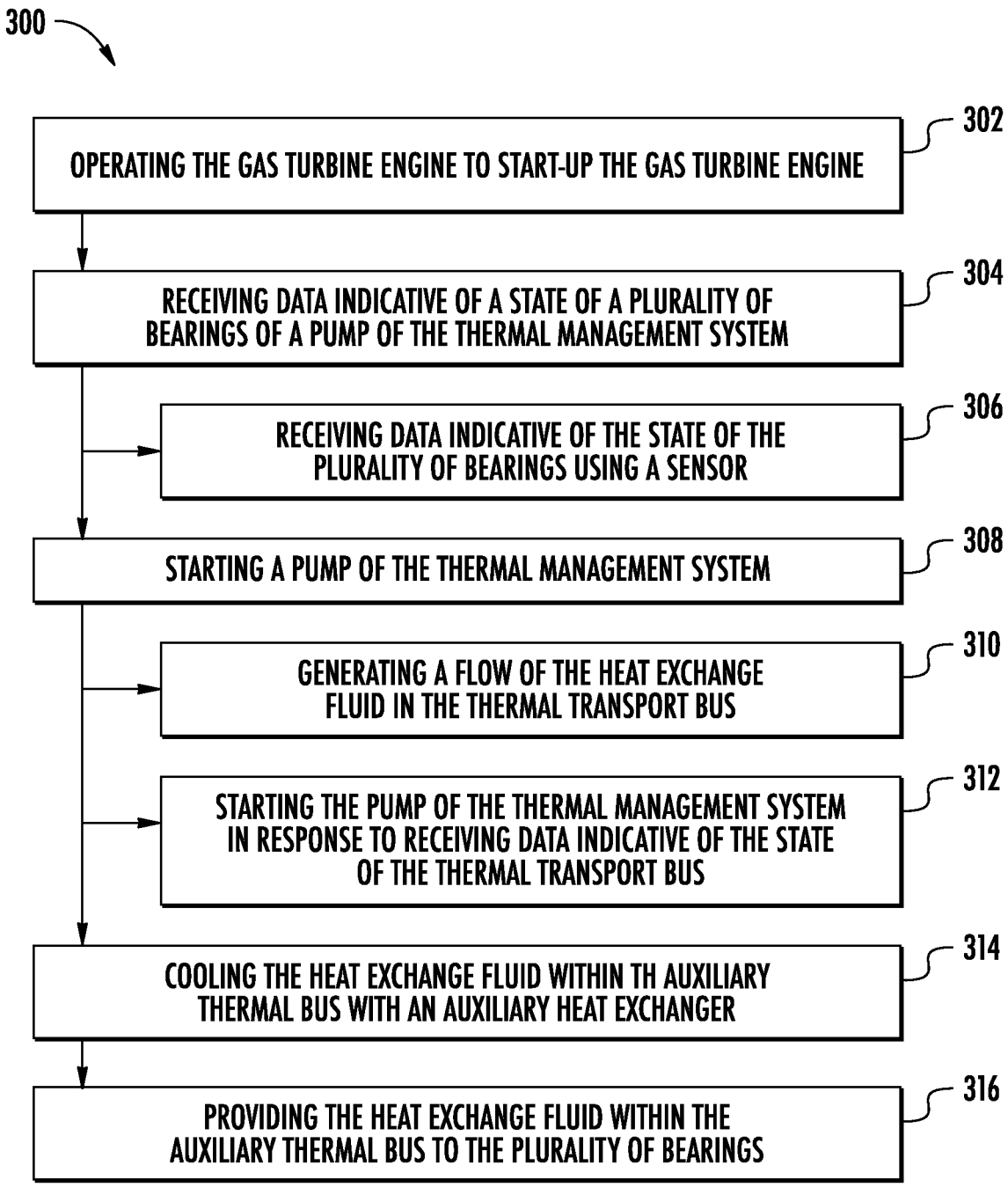
FIG. 4 is a flow diagram of a method for operating a thermal management system of a gas turbine engine in accordance with an exemplary aspect of the present disclosure.

Referring now to FIG. 4, a flow diagram of a method 300 for operating a thermal management system 100 of a gas turbine engine is provided. In at least certain exemplary embodiments, the method 300 may be utilized to operate one or more of the exemplary thermal management systems 100 described above with reference to FIGS. 1 through 3. For example, the thermal management system 100 may generally include a thermal transport bus 102, a pump 250, an auxiliary thermal bus 200, and an auxiliary heat exchanger 202. Additionally, the method 300 may be implemented by one or more controllers such as using an exemplary computing system 400 depicted in FIG. 5 and described below.

The method 300 generally includes at (302) operating the gas turbine engine to start-up the gas turbine engine. Operating the gas turbine engine to start-up the gas turbine engine at (302) may include accelerating the gas turbine engine with a starter, such as a starter motor/generator or a pneumatic starter; initiating a fuel flow to a combustion section of the gas turbine engine once a rotational speed of the gas turbine engine reaches a lightoff speed; and accelerating the gas turbine engine from the lightoff speed to an idle speed.

The method 300 additionally includes at (304) receiving data indicative of a state of a plurality of bearings of a pump of the thermal management system, and more particularly for the exemplary aspect depicted, receiving data indicative of the state of the plurality of bearings at (304) includes at (306) receiving data indicative of the state of the plurality of bearings using a sensor, such as sensor 412. For the exemplary aspect of FIG. 4, the state of the plurality of bearings 252 includes an operational temperature of the plurality of bearings 252. The sensory, such as sensor 412 of the thermal management system 100, for the exemplary aspect depicted, is a temperature sensor.

Referring still to FIG. 4, the method 300 includes at (308) starting the pump of the thermal management system. For the exemplary aspect depicted, starting the pump of the thermal management system includes at (310) generating a flow of the heat exchange fluid in the thermal transport bus. Moreover, it will be appreciated that for the exemplary aspect depicted, starting the pump of the thermal management system at (308) includes at (312) starting the pump of the thermal management system in response to receiving data indicative of the state of the thermal transport bus at (304), such as in response to receiving data indicative of the plurality of bearings having reached an operational temperature.

It will be appreciated that the data received at (304) may not be directly sensed data of an operational temperature of the plurality of bearings. For example, although not depicted, the method 300 may include one or more intervening steps of determining a phase of the heat exchange fluid based on the data received at (304), including, e.g., executing a calculation, a comparison, or a model to determine the data indicative of the phase of the heat exchange fluid. With such an exemplary aspect, starting the pump of the thermal management system in response to receiving data indicative of the state of the thermal transport bus at (312) may include starting the pump of the thermal management system in response to receiving data indicative of the state of the thermal transport bus and determining the data indicative of the operational temperature of the plurality of bearings through the one or more intervening steps of (using, e.g., a calculation, a comparison, or a model).

Further, the method 300 includes at (314) cooling the heat exchange fluid within the auxiliary thermal bus with an auxiliary heat exchanger. The heat exchange fluid defines a first average temperature when in the thermal transport bus and the heat exchange fluid defines a second average temperature when in the auxiliary thermal bus. It should be appreciated that the second average temperature is lower than the first average temperature. It will be appreciated that cooling the heat exchange fluid within the auxiliary thermal bus with an auxiliary heat exchanger will lower the temperature of the heat exchange fluid such that the heat exchange fluid in the auxiliary thermal bus defines the second average temperature.

Additionally, the method includes at (316) providing the heat exchange fluid within the auxiliary thermal bus to the plurality of bearings. The heat exchange fluid defines the second average temperature when in the auxiliary thermal bus. The lower second average temperature cools the plurality of bearings such that the plurality of bearings is at an operational temperature.

Moreover, it will be appreciated that operating a thermal management system and a gas turbine engine in accordance with one or more of the exemplary aspects described herein with reference to FIG. 4 may result improved reliability of the gas turbine engine. Specifically, operating a thermal management system in accordance with one or more of these exemplary aspects may improve the size and power density of the pump.

It will be appreciated that the thermal management system 100 may further include a computing device or controller operable with certain aspects of the thermal management system 100 for controlling various aspects of the thermal management system 100. The computing device may be part of the computing system. In such a manner, it will be appreciated that the thermal management system may further include a sensor for sensing data indicative of the pump. For example, the sensor 412 may be configured to sense data indicative of an operational temperature of the plurality of bearings 252 of the pump 250.

Figure 5:
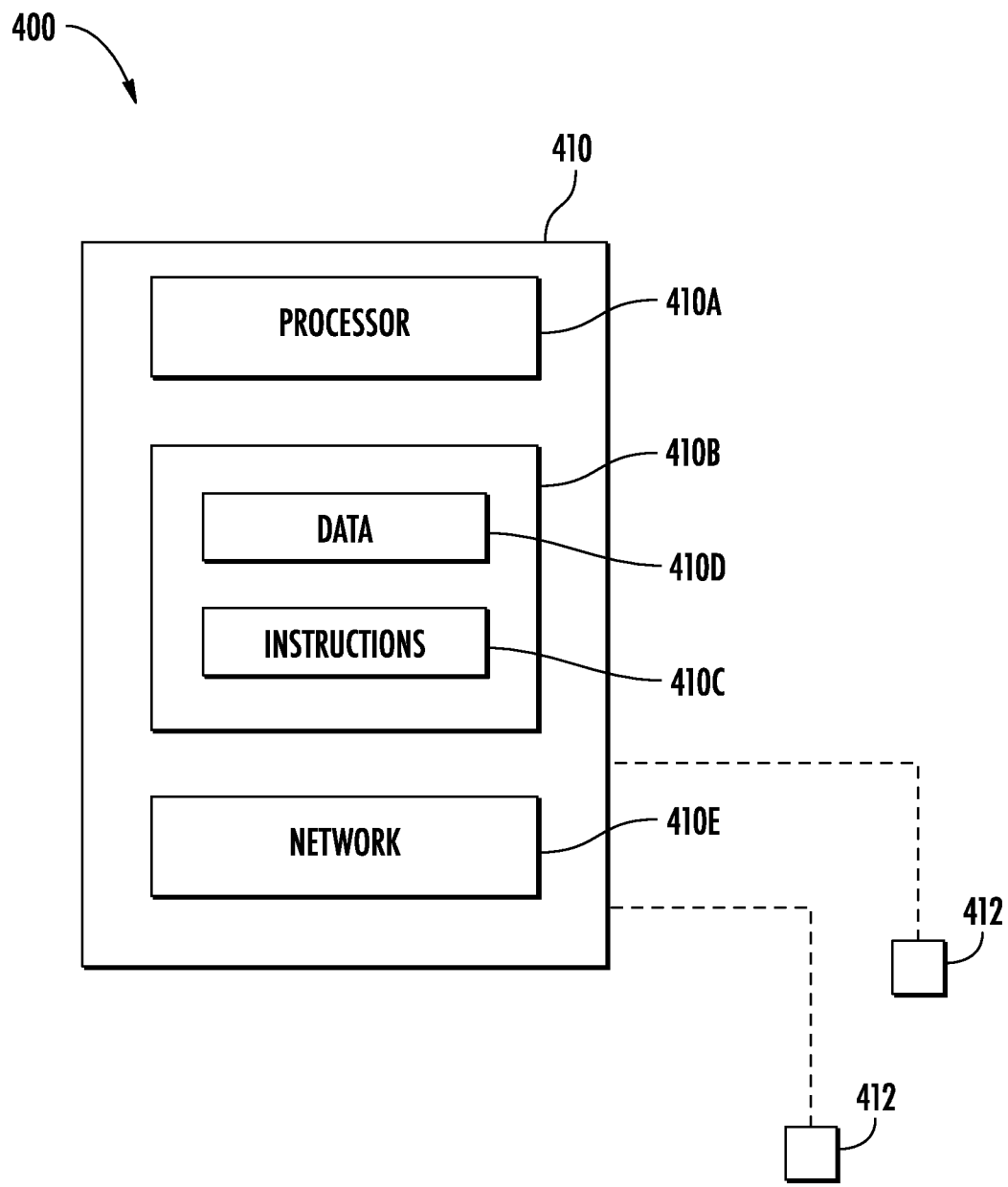
FIG. 5 is a block diagram of one embodiment of an exemplary controller that may be used within the thermal management system.

Referring now to FIG. 5, the example computing system 400 for operable use with certain aspects of the thermal management system 100, as referred to with respect to FIG. 4 is provided. The computing system 400 can be used, for example, as a controller of a thermal management system 100. The computing system 400 can include one or more computing device(s) 410. The computing device(s) 410 can include one or more processor(s) 410A and one or more memory device(s) 410B. The one or more processor(s) 410A can include any suitable processing device, such as a microprocessor, microcontroller, integrated circuit, logic device, or other suitable processing device. The one or more memory device(s) 410B can include one or more computer-readable media, including, but not limited to, non-transitory computer-readable media, RAM, ROM, hard drives, flash drives, or other memory devices.

The one or more memory device(s) 410B can store information accessible by the one or more processor(s) 410A, including computer-readable instructions 410C that can be executed by the one or more processor(s) 410A. The instructions 410C can be any set of instructions that when executed by the one or more processor(s) 410A, cause the one or more processor(s) 410A to perform operations. In some embodiments, the instructions 410C can be executed by the one or more processor(s) 410A to cause the one or more processor(s) 410A to perform operations, such as any of the operations and functions for which the computing system 400 or the computing device(s) 310 are configured, the operations for operating a thermal management system 100 (e.g., method 300), as described herein, or any other operations or functions of the one or more computing device(s) 410. The instructions 410C can be software written in any suitable programming language or can be implemented in hardware. Additionally, or alternatively, the instructions 410C can be executed in logically or virtually separate threads on processor(s) 410A. The memory device(s) 410B can further store data 410D that can be accessed by the processor(s) 410A. For example, the data 410D can include data indicative of power flows, data indicative of engine/aircraft operating conditions, or any other data or information described herein.

The computing device(s) 410 can also include a network interface 410E used to communicate, for example, with the other components of a thermal management system, gas turbine engine, etc. (e.g., via a network), such as one or more sensors 412. The network interface 410E can include any suitable components for interfacing with one or more network(s), including for example, transmitters, receivers, ports, controllers, antennas, or other suitable components.

One or more external display devices (not depicted) can be configured to receive one or more commands from the computing device(s) 410.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Further aspects are provided by the subject matter of the following clauses:

A thermal management system of a gas turbine engine, the thermal management system comprising: a thermal transport bus configured to have a heat exchange fluid flow therethrough and comprising a pump comprising a plurality of bearings; an auxiliary thermal bus in thermal communication with the plurality of bearings; and an auxiliary heat exchanger in thermal communication with the auxiliary thermal bus.

The thermal management system of any preceding clause, wherein the pump is a supercritical pump, and wherein the heat exchange fluid is a supercritical heat exchange fluid The thermal management system of any preceding clause, wherein the pump comprises a rotor and an impeller, and wherein the auxiliary thermal bus is in thermal communication with the rotor and the impeller.

The thermal management system of any preceding clause, wherein the auxiliary heat exchanger is operable to remove heat from the heat exchange fluid in the auxiliary thermal bus.

The thermal management system of any preceding clause, wherein the heat exchange fluid defines a first average temperature when in the thermal transport bus, wherein the heat exchange fluid defines a second average temperature when in the auxiliary thermal bus, and wherein the second average temperature is lower than the first average temperature.

The thermal management system of any preceding clause, wherein the pump defines an outlet, wherein the auxiliary thermal bus is operable to provide the heat exchange fluid to the plurality of bearings, and wherein the heat exchange fluid flows from the plurality of bearings to the impeller, to outlet, or a combination thereof.

The thermal management system of any preceding clause, wherein the auxiliary thermal bus is in fluid communication with the thermal transport bus at a location upstream of the pump.

The thermal management system of any preceding clause, wherein the auxiliary thermal bus is in fluid communication with the thermal transport bus at a location upstream of the pump.

The thermal management system of any preceding clause, wherein the auxiliary thermal bus is a recirculation loop.

The thermal management system of any preceding clause, wherein the auxiliary thermal bus is formed integrally with the pump.

The thermal management system of any preceding clause, wherein the thermal management system comprises: a second auxiliary heat exchanger that is operable to add heat to the heat exchange fluid in the auxiliary thermal bus.

The thermal management system of any preceding clause, wherein the thermal transport bus comprises a valve and a controller, wherein the controller is operably coupled to the valve.

A method of operating a thermal management system of a gas turbine engine; the method comprising: receiving data indicative of a state of a plurality of bearings of a pump of the thermal management system using a sensor, the state of the plurality of bearings including an operational temperature of the plurality of bearings; starting the pump in response to receiving the data indicative of the state of the plurality of bearings, the pump in fluid communication with a thermal transport bus and an auxiliary thermal bus; cooling a heat exchange fluid within the auxiliary thermal bus with an auxiliary heat exchanger; and providing the heat exchange fluid within the auxiliary thermal bus to the plurality of bearings of the pump.

The method of any preceding clause, wherein starting the pump comprises generating a flow of the heat exchange fluid in the thermal transport bus.

A gas turbine engine comprising: a heat source; and a thermal management system comprising: a thermal transport bus configured to have a heat exchange fluid flowing therethrough; an auxiliary thermal bus in fluid communication with the thermal transport bus; and an auxiliary heat exchanger in thermal communication with the auxiliary thermal bus.

The gas turbine engine of any preceding clause, wherein the heat source is a main lubrication system for providing lubrication to a bearing system of the gas turbine engine.

The gas turbine engine of any preceding clause, wherein the thermal transport bus comprises a pump having a plurality of bearings, and wherein the auxiliary thermal bus is in fluid communication with the plurality of bearings.

The gas turbine engine of any preceding clause, wherein the pump is a supercritical pump, and wherein the heat exchange fluid is a supercritical heat exchange fluid.

The gas turbine engine of any preceding clause, wherein the pump comprises a rotor and an impeller, and wherein the auxiliary thermal bus is in thermal communication with the rotor and the impeller.

The gas turbine engine of any preceding clause, wherein the auxiliary heat exchanger is operable to remove heat from the heat exchange fluid in the auxiliary thermal bus.

The gas turbine engine of any preceding clause, wherein the heat exchange fluid defines a first average temperature when in the thermal transport bus, wherein the heat exchange fluid defines a second average temperature when in the auxiliary thermal bus, and wherein the second average temperature is lower than the first average temperature.

The gas turbine engine of any preceding clause, wherein the pump defines an outlet, wherein the auxiliary thermal bus is operable to provide the heat exchange fluid to the plurality of bearings, and wherein the heat exchange fluid flows from the plurality of bearings to the impeller, to outlet, or a combination thereof.

The gas turbine engine of any preceding clause, wherein the thermal transport bus comprises a valve and a controller, wherein the controller is operably coupled to the valve.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A thermal management system of a gas turbine engine, the thermal management system comprising:
   a thermal transport bus configured to have a heat exchange fluid flowing therethrough and comprising a pump comprising a plurality of bearings;
   an auxiliary thermal bus in thermal communication with the plurality of bearings; and
   an auxiliary heat exchanger in thermal communication with the auxiliary thermal bus.

2. The thermal management system of claim 1, wherein the pump is a supercritical pump, and wherein the heat exchange fluid is a supercritical heat exchange fluid.

3. The thermal management system of claim 1, wherein the pump comprises a rotor and an impeller, and wherein the auxiliary thermal bus is in thermal communication with the rotor and the impeller.

4. The thermal management system of claim 3, wherein the auxiliary heat exchanger is operable to remove heat from the heat exchange fluid in the auxiliary thermal bus.

5. The thermal management system of claim 4, wherein the heat exchange fluid defines a first average temperature when in the thermal transport bus, wherein the heat exchange fluid defines a second average temperature when in the auxiliary thermal bus, and wherein the second average temperature is lower than the first average temperature.

6. The thermal management system of claim 4, wherein the pump defines an outlet, wherein the auxiliary thermal bus is operable to provide the heat exchange fluid to the plurality of bearings, and wherein the heat exchange fluid flows from the plurality of bearings to the impeller, to outlet, or a combination thereof.

7. The thermal management system of claim 1, wherein the auxiliary thermal bus is in fluid communication with the thermal transport bus at a location upstream of the pump.

8. The thermal management system of claim 1, wherein the auxiliary thermal bus is a recirculation loop.

9. The thermal management system of claim 1, wherein the auxiliary thermal bus is formed integrally with the pump.

10. The thermal management system of claim 1, wherein the thermal management system comprises:
    a second auxiliary heat exchanger that is operable to add heat to the heat exchange fluid in the auxiliary thermal bus.

11. A method of operating a thermal management system of a gas turbine engine;
    the method comprising:
        receiving data indicative of a state of a plurality of bearings of a pump of the thermal management system using a sensor, the state of the plurality of bearings including an operational temperature of the plurality of bearings;
        starting the pump in response to receiving the data indicative of the state of the plurality of bearings, the pump in fluid communication with a thermal transport bus and an auxiliary thermal bus;
        cooling a heat exchange fluid within the auxiliary thermal bus with an auxiliary heat exchanger; and
        providing the heat exchange fluid within the auxiliary thermal bus to the plurality of bearings of the pump.

12. The method of claim 11, wherein starting the pump comprises generating a flow of the heat exchange fluid in the thermal transport bus.

13. A gas turbine engine comprising:
    a heat source; and
    a thermal management system comprising:
        a thermal transport bus configured to have a heat exchange fluid flowing therethrough;
        an auxiliary thermal bus in fluid communication with the thermal transport bus;
        an auxiliary heat exchanger in thermal communication with the auxiliary thermal bus; and
        a pump having a plurality of bearings, and wherein the auxiliary thermal bus is in fluid communication with the plurality of bearings.

14. The gas turbine engine of claim 13, wherein the heat source is a main lubrication system for providing lubrication to a bearing system of the gas turbine engine.

15. The gas turbine engine of claim 13, wherein the pump is a supercritical pump, and wherein the heat exchange fluid is a supercritical heat exchange fluid.

16. The gas turbine engine of claim 13, wherein the pump comprises a rotor and an impeller, and wherein the auxiliary thermal bus is in thermal communication with the rotor and the impeller.

17. The gas turbine engine of claim 16, wherein the auxiliary heat exchanger is operable to remove heat from the heat exchange fluid in the auxiliary thermal bus.

18. The gas turbine engine of claim 17, wherein the heat exchange fluid defines a first average temperature when in the thermal transport bus, wherein the heat exchange fluid defines a second average temperature when in the auxiliary thermal bus, and wherein the second average temperature is lower than the first average temperature.

19. The gas turbine engine of claim 17, wherein the pump defines an outlet, wherein the auxiliary thermal bus is operable to provide the heat exchange fluid to the plurality of bearings, and wherein the heat exchange fluid flows from the plurality of bearings to the impeller, to outlet, or a combination thereof.

* * * * *